United States Patent [19]

Bold

[11] Patent Number: 4,942,003
[45] Date of Patent: Jul. 17, 1990

[54] METHOD FOR CONTINUOUSLY PRODUCING MOLDED MEMBERS FROM A MIXTURE OF GYPSUM AND FIBROUS MATERIAL

[75] Inventor: Jörg Bold, Kaiserslautern, Fed. Rep. of Germany

[73] Assignee: "Würtex" Maschinenbau Hofmann GmbH & Co., Uhingen, Fed. Rep. of Germany

[21] Appl. No.: 319,800

[22] Filed: Mar. 3, 1989

Related U.S. Application Data

[63] Continuation-in-part of Ser. No. 791,225, Oct. 25, 1985, abandoned.

[30] Foreign Application Priority Data

Oct. 27, 1984 [DE] Fed. Rep. of Germany ....... 3439493

[51] Int. Cl.$^5$ ................................................ B28C 5/40
[52] U.S. Cl. ................................... 264/40.4; 106/772; 156/39; 264/113; 264/122; 264/333
[58] Field of Search ............... 264/110, 112, 113, 122, 264/333, 40.4; 156/39; 106/109, 110, 115

[56] References Cited

U.S. PATENT DOCUMENTS

| | | | |
|---|---|---|---|
| 2,744,045 | 5/1956 | Collins | 264/113 X |
| 3,809,566 | 5/1974 | Revord | 106/110 |
| 3,951,735 | 4/1976 | Kondo et al. | 162/133 |
| 4,239,716 | 12/1980 | Ishida et al. | 264/86 |
| 4,328,178 | 5/1982 | Kossatz | 264/69 |
| 4,369,025 | 1/1983 | von der Weid | 264/113 X |

FOREIGN PATENT DOCUMENTS

| | | |
|---|---|---|
| 2257827 | 6/1974 | Fed. Rep. of Germany ...... 264/113 |
| 3216886 | 11/1983 | Fed. Rep. of Germany . |
| 3404658 | 8/1985 | Fed. Rep. of Germany . |
| 625462 | 9/1981 | Switzerland ........................ 264/122 |

OTHER PUBLICATIONS

The Chemistry and Technology of Gypsum, Kuntze, ed., 1984, pp. 44, 46, 51.
ASTM Designation C11-70.
Chemie Lexikon, Römp, 1966, p. 2548.
Webster's Third New International Dictionary, 1966, p. 1015.

*Primary Examiner*—Jan H. Silbaugh
*Assistant Examiner*—Mary Lynn Fertig
*Attorney, Agent, or Firm*—Robert W. Becker and Associates

[57] ABSTRACT

A method and apparatus for continuously producing molded member, especially sheets, from a mixture of gypsum and fibrous material. In a first mixing stage, measured-out quantities of gypsum and fibrous material are thoroughly mixed together, with the dry mixture being weighed and subsequently moistened in a second mixing stage by supplying water thereto in conformity to the weight of the dry mixture. The moistened mixture is subsequently dispersed onto a support to form molded members, with the surface of each molded member being additionally moistened, and the latter then being compacted. To achieve higher strength, the mas flow of the gypsum/fibrous material mixture is divided into independent partial mass flows that are dispersed in layers to form the multi-layer molded member, with each partial mass flow forming one of the layers of the molded member. Each deposited layer is additionally moistened with water, with the total quantity of water supplied to a given molded member equalling up to about 25% more than the stoichiometric quantity of water required for curing the gypsum/fibrous material mixture.

36 Claims, 6 Drawing Sheets

METHOD FOR CONTINUOUSLY PRODUCING MOLDED MEMBERS FROM A MIXTURE OF GYPSUM AND FIBROUS MATERIAL

This application is a continuation-in-part, of application Ser. No. 791,225 filed Oct. 25, 1985, now abandoned.

BACKGROUND OF THE INVENTION

1. Field of the Invention

The present invention relates to a method of continuously producing molded members, especially sheets, from a mixture of gypsum and fibrous material. In a first mixing stage, respective measured-out quantities of gypsum and fibrous material are thoroughly mixed together, with the dry gypsum/fibrous material mixture being weighed and subsequently moistened in second mixing stage by supplying water thereto in conformity to the weight of the dry mixture. The moistened mixture is subsequently dispersed onto a support to form molded members, with the surface of each molded member being additionally moistened, and the latter then being compacted. The present invention also relates to an apparatus for carrying out such a method. The apparatus includes: a first metering mechanism for the measured-out addition of gypsum and fibers to a dry mixer; a second metering mechanism for measuring out a given volume and/or weight of dry gypsum/fiber mixture, as a function of which a third metering mechanism for measuring out liquid is controlled; a wetting mixer for receiving dry gypsum/fiber mixture from the second metering mechanism, and liquid from the third metering mechanism for moistening the mixture; a dispersal mechanism, the dispersal head of which disperses moistened gypsum/fiber mixture from the wetting mixer as a molded member onto a forming line; and spray nozzles disposed, when viewed in the conveying direction of the forming line, before and after the dispersal head for additionally moistening the surface of the molded member.

2. Description of the Prior Art

A method of the aforementioned general type is known from German Offenlegungsschrift 34 04 658, published Aug. 14, 1985 belonging to the assignee of the present invention. The dry, pre-mixed gypsum/fiber mass is moistened in a further mixing stage by adding a measured quantity of water thereto. In so doing, the maximum amount of water added is that quantity which is stoichiometrically required for assuring curing of the gypsum. By preparing the mixture in this fashion, the material which is to be dispersed can be transported and stored with no problem. The instruments used do not become very dirty, and it is easy to separate and orient the fibers. It is even possible to eliminate drying if water is supplied in a precisely stoichiometric quantity.

However, practice has shown that an exact stoichiometric supply of water is generally impossible, since slight variations in the mixing ratio and in the quality of the raw materials invariably occur. If an excess amount of water is added, it is necessary to subsequently dry the sheets, whereas if too little water is added there is not enough water for the complete curing reaction of the gypsum, which leads to a considerable weakening of the sheets. Furthermore, when water is added in stoichiometric quantities, between 1 and 3% of residual moisture remains. This unused residual moisture corresponds to a quantity of 5 to 15% non-cured gypsum, which leads to a weakening of the strucure of the sheets.

The remaining 1 to 3% residual moisture is a drawback in that it is practically impossible to use such sheets as high-grade construction material. It is precisely in the range of 0 to 3% residual moisture that the gypsum/fibrous material experiences very great changes in volume, which can show up in an up to 0.3 of the % linear change in lengths (3 mm per m). If in the extreme case moist sheets that have been placed so that no joint appears are dried to 0% residual moisture, all of the joints pull apart during subsequent adjustment to the ambient temperature.

Furthermore, the course of the curing process is disadvantageous when a stoichiometric quantity of water is added. The gypsum crystallizes on the spot because no water is available for the transport of the calcium sulfate ions. The sheet therefore becomes an easily caking aggregate of granules that retain the original shape of the gypsum granules.

Although during a subsequent spraying of the surface of the molded member with water this surface receives a firm, uniform structure, it has been proven that the stabilization or setting of the surface by itself does not assure a sufficiently high sheet quality. In particular, when the sheets are nailed or screwed, large chunks of the solidified surface break off.

German Offenlegungsschrift 34 04 658 dated Aug. 14, 1985 belonging to the assignee of the present invention makes reference to another German Offenlegungsschrift 32 16 886 dated Nov. 10, 1983 and also belonging to the assignee of the present invention. This known method allows plaster-fiber plates, sheets or panels of satisfactory quality to be produced. However the disadvantage exists that during mass production of such plaster-fiber plates, sheets or panels, the statistical dispersal for transverse stress and flexure, transverse strength or bending strength is comparatively great. Also there has been shown that smaller, mostly point-shaped provision of fiber nests upon the panel outer side can lead to small pock-type elevations, which for many applications or purposes of use represent an influencing of the quality of such plaster-fiber panels and consequently make necessary eventually a grinding or post-working of the surface thereof.

An object of the present invention is to provide a method for the continuous production of molded members, especially sheets, from a mixture of gypsum and fibrous material, with the sheets produced pursuant to this method receiving a pervading high strength with little variation, with this strength being obtained in a short curing and drying time.

A further object of the present invention is to provide a method for continuous production of molded bodies or members, especially of plates, sheets, or panels, of plaster or calcined gypsum and fiber material, with which the surfaces of the plates or panels in essence are free of pocks or depressions and flaws and with which furthermore optimum strength values of nominal statistical dispersal also are attainable with mass production. Furthermore an apparatus for performing and carrying out this inventive method can be found disclosed herewith.

It is a further object of the present invention to provide an apparatus for carrying out the aforementioned method.

BRIEF DESCRIPTION OF THE DRAWINGS

These objects, and other objects and advantages of the present invention, will appear more clearly from the following specification in conjunction with the accompanying drawings, in which.

SUMMARY OF THE INVENTION

Figure 1:
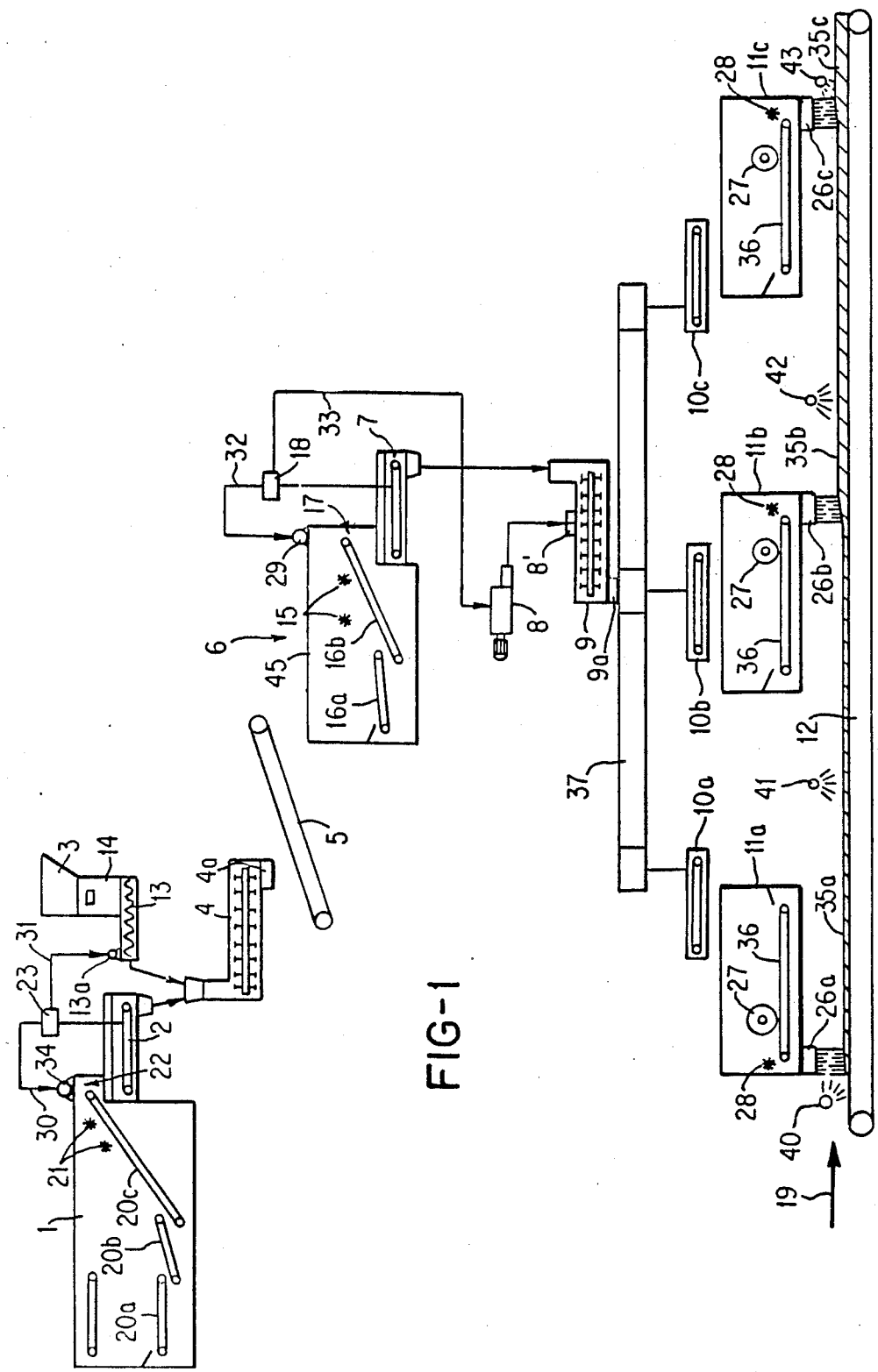
FIG. 1 shows one inventive embodiment of an apparatus for carrying out the inventive method, with the mass flow being divided subsequent to the wetting mixing process.

The method of the present invention is characterized primarily by the following steps: dividing the mass flow of the gypsum/fibrous material mixture into independent partial mass flows; dispersing a first one of the partial mass flows onto the support means as a first layer of a given one of the molded members; respectively dispersing second and subsequent ones of the partial mass flows onto the first layer and subsequent layers of the given molded member as a second and subsequent layers; and additionally moistening each of the layers with water prior to dispersing a subsequent layer thereon, with the total quantity of water supplied to a given molded member equally up to 25% more than the stoichiometric quantity of water required for curing the gypsum/fibrous material mixture dispersed to form a molded member.

During the moistening of the dry gypsum/fiber mixture in the second mixing stage, such a quantity only of water is added that no clumping or granulation of the gypsum/fiber mixture can occur. This critical value of the water quantity is never exceeded with the inventive method, so that up to the time of placement onto the support no segregation or clumping of the gypsum/fiber mixture occurs, and a good separation of the fibers is assured. In order to add to the molded bodies that quantity of water required for curing, the mass flow is divided into a plurality of independent partial mass flows, each of which is dispersed as an individual layer of the molded member onto the support or the previous layer. Each layer is additionally moistened independent of the other layers with a predetermined quantity of water. The total quantity of water supplied, including the quantity of water for moistening the dried gypsum/fibrous material mixture, is controlled in such a way that an additional quantity water supplied to the molded member equals up to 25%, as based on the dry gypsum mass respectively, more than the stoichiometric quantity of water mathematically required for curing the gypsum/fibrous material mixture. Since the additional quantity of water is added by being divided onto several individual layers, an additional mixing, and the disadvantageous clumping of granulation of the gypsum connected therewith, are eliminated.

Due to the greater than stoichiometric addition of water, for the already occurring setting procedure, hardening or curing process still additionally sufficient water is present to assure a transport of the calcium sulfate ions in all directions. This guarantees that the molded member crystallizes in well-shaped, idiomorphic, needle-shaped crystals that grow together and interlock. A high mechanical strength of the sheets is achieved in this manner.

Furthermore, the greater than stoichiometric addition of water effects an increased plasticity of the gypsum during compression or compaction. This means that the gypsum material can be pressed into all hollow spaces, which in turn effects an improved binding of the fibers. In addition, the plasticity allows a somewhat more coarsely ground gypsum to be used, resulting in economical advantages. Furthermore, due to the adhesive or binding power of the wet gypsum, the elastic forces of the cellulose fibers deformed during the compaction are compensated for. As a result, the presses can be opened after the molded members have been compacted for only a brief period of time, without it being necessary to adapt the compaction time to the curing process. Due to the higher plasticity, the surface of the molded member conforms precisely to the base of the press, so that a smooth press base forms a smooth surface on the molded member. In constrast thereto, if water is added in an only precise stoichiometric quantity, powdery surfaces are obtained, and if only slightly greater than stoichiometric quantities of water are added, pitted or pocked surfaces are obtained. With a wet method with a great excess of water, shaped rollers or screens must be used, thus requiring a subsequent grinding or the like. In all of the heretofore known methods, one can count on grinding loses of the sheets in the order of magnitude of at least 3%, and generally even 10%.

Due to the greater than stoichiometric addition of water in the order of magnitude of up to 25%, and preferably approximately 15 to 20%, based on the dry mass of calcinated gypsum, the curing process of the gypsum is also considerably accelerated. Therefore, when setting up a plant, the cost for the curing section are considerably more economical than with a comparable plant set up for practicing the methods of the heretofore known state of the art.

It can be expedient to divide the moist gypsum/fibrous material mixture into a plurality of partial flows after the second mixing stage (FIG. 1). Alternatively, with a different embodiment of the inventive method, the dried gypsum/fibrous material mixture is divided into a plurality of partial flows already after the first dry mixing stage; as a result, it is possible to add dry additives to a partial mass flow. In this way, the relative length of time between the time the gypsum/fibrous material mixture is moistened and reaches the press can further be optimally shortened.

The partial mass flows advantageously have different volumes, so that layers of different thicknesses can be formed. In order to obtain a central core layer and a number of layers dispersed thereon, an odd number of partial mass flows is provided. In this connection, it is possible to add additives to each of the partial mass flows. In particular, additives are added to the core layer, which advantageously has a greater volume partial mass flow.

The supply of the individual water quantities is controlled in a similar manner, with the total quantity preferably being 15 to 20%, based on the dry gypsum mass, greater than the stoichiometric quantity of water. The quantity of water added to the individual layers after the dispersal can vary. In particular, a greater quantity of water can be added to the outer layers of the molded member than to the inwardly disposed layers. Furthermore, the water quantities sprayed onto the individual layers can contain additives. Thus, it can be expedient to add to the water quantity of the outer layer of the molded member suspensions or emulsions of pigments and/or synthetic resins. In this way, without requiring a second process, it is possible already during the manufacture to provide, for example, a surface decoration, a water-repellant impregnation, or a fire-protection material. The inventive method is furthermore advantageous in that sheets produced thereby have finished surfaces that do not have to be subsequently ground or otherwise treated. Furthermore, an initially non-accelerated or easily decelerated base mixture can be accelerated by adding accelerator solution (e.g. potassium sulfate) shortly before compaction.

One advantageous inventive embodiment of an apparatus for carrying out the inventive method comprises a plurality of independent dispersal heads disposed between the spray nozzles and one after the other when viewed in the conveying direction of the forming line, with the dispersal heads being respectively supplied with partial mass flows from a mass flow of moistened gypsum/fiber mixture from the wetting mixer, the dispersal heads also being provided for independent dispersal of individual molded member layers onto the forming line; furthermore, at least one further spray nozzle is disposed between each of the dispersal heads when viewed in the conveying direction of the forming line.

Further features and advantageous embodiments of the present invention will be described subsequently.

DESCRIPTION OF THE PREFERRED EMBODIMENTS

Referring now to the drawings in detail, a quantity of fibers is withdrawn from a fiber bin or hopper 1 by means of motor-driven conveyer belts 20a, 20b, and 20c. The withdrawn quantity of fibers is volumetrically preliminarily measured out via equalizing rollers 21 or the like. The rollers 21 are disposed at the end of the last conveyer belt 20c in the vicinity of the outlet 22 of the fiber hopper 1.

Disposed below the outlet 22 is a known, continuously operating weighing device 2, for example a conveyer-type weigher, which weighs the quantity of fibers exiting the hopper 1 and conveys these fibers into a dry mixer 4 via a chute or the like. The preferably electronic weighing device 2 emits an output signal in conformity with the detected weight of the quantity of fibers; this signal is fed to an electronic control device 23 which, as a function of this output signal, regulates, via a control line 31, the speed of the drive motor 13a of a screw conveyer 13 of a metering scale 14 associated with the device 3 for measuring out gypsum.

The control device 23 furthermore regulates at least the conveying speed of the last conveyer belt 20c of the fiber hopper 1 in conformity with a differential value formed from the output signal of the conveyer-type weigher 2 and a value preset for the control device 23. Furthermore, the control device 23 also monitors the preset quantity ratio of gypsum to fibrous material, and via the control lines 30 and 31 appropriately affects the conveying speeds of the conveyer belt 20c and the screw conveyer 13 of the metering device 3.

The measured value of the continuous weighing of the gypsum and fiber quantities controls the preselected desired values of the fiber quantity (F) and of the gypsum quantity (G) in such a way that the ratio F/G and the sum G+F are constant.

The dry mixer 4 is preferably a horizontal continuous mixer having a rotating mixer shaft on which are radially disposed mixing instruments in which the material that is to be mixed passes through largely without backing up. The metered starting quantities of gypsum and fibrous material are continuously supplied to one end of the mixer 4. At the other end of the mixer, the dry mixture of gypsum and fibers exiting the outlet 4a are preferably conveyed via a conveyer belt 5 having a variable speed drive into an intermediate hopper 45 of the device 6 for measuring out gypsum and fibers. By means of conveyer belts 16a, 16b disposed in the intermediate hopper 45, the mixture can be withdrawn from the latter as needed.

Disposed at the end of the last conveyer belt 16b, that is driven by a motor 29, and in the vicinity of the hopper outlet 17, are equalizing rollers 15 by means of which the quantity of the dry mixture of gypsum and fibers can be volumetrically preliminarily metered. The dry mixture drops directly upon a weighing device that is disposed below the outlet 17 and preferably comprises a conveyer-type weigher 7. The output signal of the weigher 7 is fed to an electronic control device 18 that on the one hand, via the control line 32, controls the conveying speed of the last conveyer belt 16b, and on the other hand, via the control line 33, controls a device 8 for measuring out water. This metering device 8 is controlled in such a way that there is always supplied a quantity of water that is less than a threshold value above which the moistened gypsum/fiber mixture tends to form granules or lumps. Even when the quantity of the dry gypsum/fiber mixture fluctuates during the continuous method, the quantity of water supplied to the dry mixture is always precisely adjusted to the actual quantity involved in the mixing process, so that nearly a stoichiometric addition of water is provided during the mixing process.

The regulated metering of the water can be inventively effected in a wetting mixer 9 in such a way that the regulating signal is effectively delayed by that time interval required by the measured quantity of the gypsum/fiber mixture to reach the location (nozzle) 8' for the addition of water.

The dry gypsum/fiber mixture weighed by the conveyer-type weigher 7 is supplied directly to the wetting mixer 9, which is preferably also embodied as a continuous mixer having a rotating mixer shaft on which are disposed mixing implements. Via the water metering device 8, which is regulated by the control device 18, the precisely metered quantity of water is supplied to the mixing stream in the wetting mixer 9 via nozzles 8'. These nozzles 8' preferably spray the water at right angles to the longitudinal axis of the mixing stream that passes through the mixer 9 in the cylindrical interior thereof.

At the outlet 9a of the continuous mixer 9, the gypsum/fiber mixture that has been moistened with water drops into a distribution device 37 that divides the mass flow, preferably via rhythmical, i.e. cyclical, changes of direction, into three mass flows on conveyer belts 10a, 10b, and 10c that are driven at variable speeds. Each of the conveyer belts 10a to 10c supplies the intermediate hopper of a known dispersal mechanism 11a, 11b, and 11c. The dispersal mechanisms 11a to 11c are all constructed in the same manner, and are provided with a conveyer belt 36, at least one equalizing roller 27, and a discharge roller 28.

A forming line 12 travels below the dispersal heads 26a to 26c of each dispersal mechanism 11a to 11c, with the dispersal heads 26a to 26c being disposed one after the other when viewed in the conveying direction 19 of the forming line 12. When viewed in this conveying direction 19 of the forming lines 12, there is provided prior to the first dispersal head 26a a spray nozzle 40 for the supply of water. Furthermore, a spray nozzle 41 or 42 is disposed between the dispersal heads 26a and 26b as well as between the dispersal heads 26b and 26c respectively. Water is also supplied after the last dispersal head 26c via a spray nozzle 43. This arrangement assures that the spray nozzles 40 to 43 do not become dirty and cannot become clogged, since these nozzles are disposed beyond the swirling dust zones between adjacent dispersal heads.

Due to the variable drives for the conveyer belts, it is possible to adjust the speed of these belts, so that it is possible to have a continuous operation while taking into consideration the overall time sequence, i.e., so that the overall duration between moist mixing and compacting in each layer is the same. Due to the continuous weight-metered supply of the dry mixture to the mixer 9, and the moistening by means of a quantity of water that is regulatable as a function of the electrical output signal of the weighing device 7, it is possible to continuously produce gypsum/fiber sheets without having a great variation of the strength factors. In the embodiment illustrated in FIG. 1, prior to placing a first layer 35a of the molded member that is to be manufactured onto the forming line 12 by means of the nozzle 40, the surface of the forming line is moistened with water. The first partial mass flow of the gypsum/fiber mixture that has been moistened in the previously described manner is sprayed or dispersed onto the thus moistened forming line 12. The first layer 35a is moved in the direction of the arrow 19 below the nozzle 41, where the outer surface of the layer 35a is additionally moistened by being sprayed with water or a water mist. As it passes the dispersal head 26b, this additionally moistened surface of the layer 35a, is sprayed with the second layer 35b, the outer surface of which is then additionally moistened with water via the nozzle 42. Sprayed onto this layer 35b is then the third layer 35c, the outer surface of which is subsequently additionally moistened with water via the nozzle 43. The mat-like molded member, which is thus formed in layers, is compressed or compacted in a press disposed downstream of the forming line 12; the molded member is subsequently squared, and is then stored so that it can cure and dry. The individual devices of the inventive unit, such as the weighing devices 2 and 7, the mixers 4 and 9, the metering devices 3, 6, and 8, and the dispersal mechanisms 11a to 11c, operate continuously, so that sheets can be manufactured continuously without interruptions.

It has been shown that by dividing the mass flow into a plurality of, preferably three, separate partial mass flows, and by the additional moistening, it is possible to produce a high-strength sheet. Altogether, up to 25%, and preferably 15 to 20%, water based on the dry gypsum mass in addition to the stoichiometric quantity of water can be added, as a result of which it is possible to have mass transfer of calcium sulfate ions in all directions, and the gypsum crystallizes in well-shaped idiomorphic, needle-like crystals that grow together and interlock. A sheet of this type has excellent structural properties, and exhibits clearly greater transverse and flexural tensile strength than do conventional sheets. In particular, an outstanding sheet surface is achieved that is free of pock-like raised portions, and therefore does not have to be post-treated.

Figure 4:
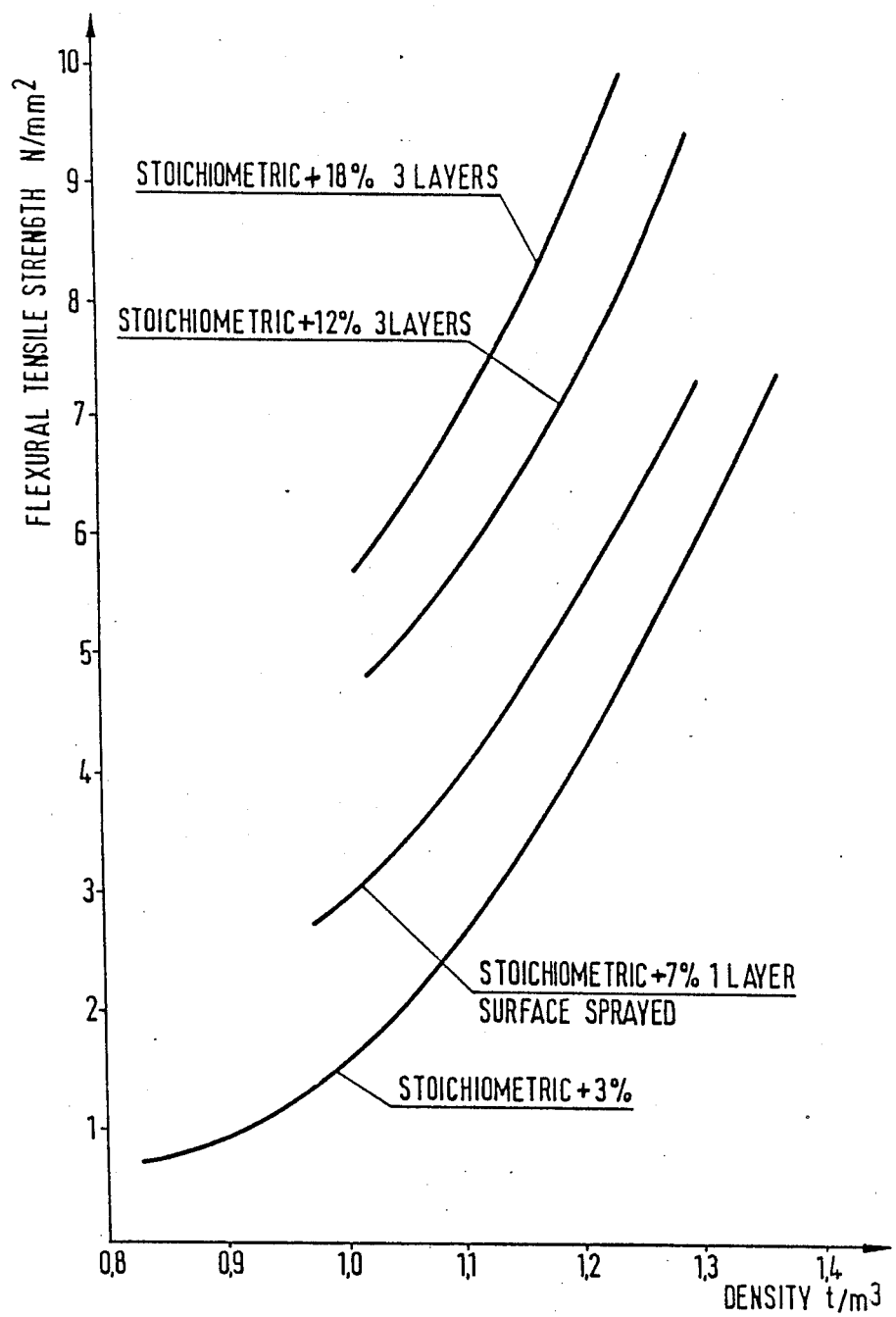
FIG. 4 is a graph showing flexural tensile strength plotted against the density of gypsum/fiber sheets.

The effect of the greater than stoichiometric addition of water in the order of magnitude of 15 to 20% based on the dry mass of calcinated gypsum can be seen from FIG. 4. In this graph the flexural tensile strength is plotted against density at various water quantity additions. In the region of the in-practice realized densities of between 1.15 and 1.2, the strength doubles in relationship to the stoichiometrically added water which corresponds only to the stoichiometric water addition. The graph of FIG. 4 clearly shows the positive effect relative to the high strength of gypsum/fiber sheets where water has been added at greater than stoichiometric quantities, with which besides water for setting or curing of the gypsum additionally up to 25% water based on or relative to the dry mass of the calcinated gypsum is added (so-called excess water).

Figure 5:
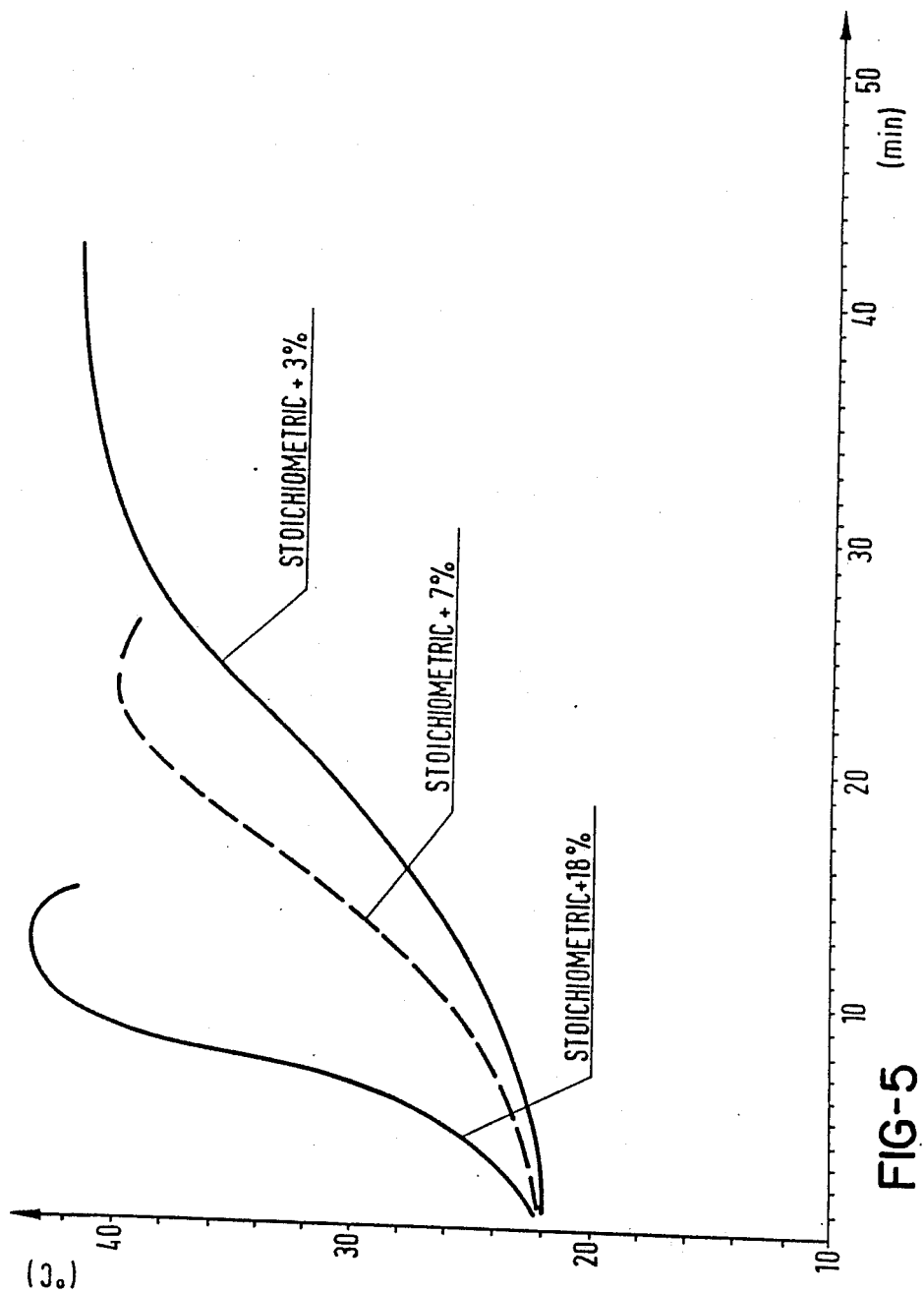
FIG. 5 is a graph showing the curing progress of gypsum/fiber sheets having different proportions of greater than stoichiometric quantities of water.

Furthermore, a considerably more rapid curing is achieved as a result of the greater than stoichiometric addition of water. This rapid curing is illustrated in FIG. 5 versus the increase in temperature that occurs. With the stoichiometric addition of water, curing times are achieved in the order of magnitude of thirty minutes. This situation is characterized by a very slowly rising curve, which indicates an incomplete reaction. In the case of a greater than stoichiometric addition of water in the order of magnitude of 18% water, curing times of about ten minutes are achieved, with the increase in temperature very rapidly ceasing at a high level. This is an indication of complete curing of the gypsum, and graphically illustrates the improved structural properties of the sheets produced pursuant to the inventive method.

Figure 3A:
FIGS. 3a to 3e are sectional views through various embodiments of sheets.
Figure 3B:
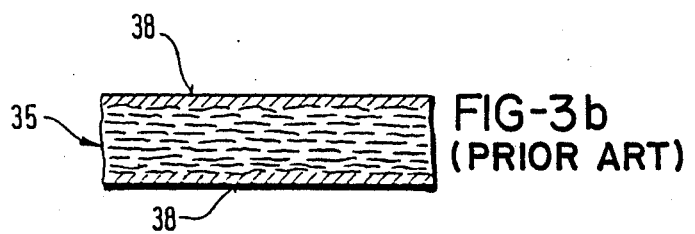
Figure 3C:
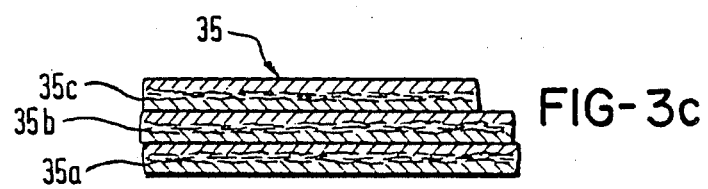
Figure 3D:
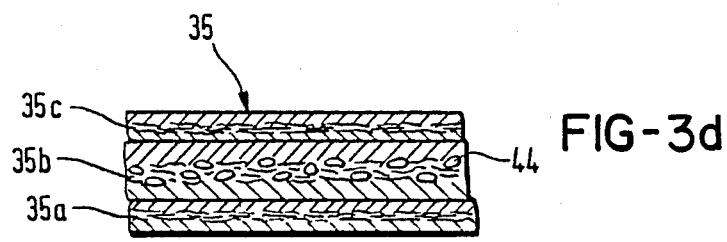
Figure 3E:
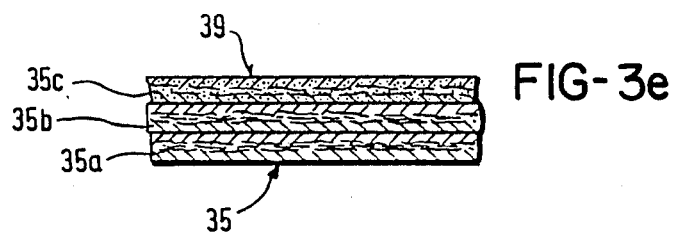

Examples of sheets that can be produced pursuant to the inventive method are illustrated in FIGS. 3c to 3e. FIG. 3a is a section through a sheet that was produced pursuant to the conventional method. The sheet of FIG. 3b, that is produced pursuant to the aforementioned previous German Patent Application 34 04 658.5 and has an already somewhat improved transverse and flexural tensile strength, has more compact surfaces 38 that are achieved by spraying both sides of the molded member with water. This heretofore known method is described in detail in the aforementioned German Patent Application.

The sheets produced pursuant to the inventive method comprise three layers 35a to 35c, and are based on splitting the mass flow into an odd number of partial mass flows, namely three such partial mass flows. Three partial mass flows are sufficient for producing a 10 mm thick gypsum/fiber sheet having high strength and a central core layer. However, it can also be advantageous to select a greater division of the layers. The sheet illustrated in section in FIG. 3c was constructed from three partial mass flows of equal volume. A greater strength or stability of the gypsum is achieved in the region of the layer interfaces. The volumes of the partial streams are selected in such a way that respective layer thicknesses of 1 to 7 mm are obtained after compression molding. In particular, the volumes of the partial streams are such that after the compression molding a layer thickness of 2 to 4.5 mm, and more particularly 2 to 3 mm, results.

The sheet illustrated in section in FIG. 3d was also composed of three partial mass flows. The partial mass flow that formed the core layer 35b was provided with a greater mass volume than were the remaining partial mass flows of the outer layers 35a and 35c. Additives 44 were added to the partial mass flow that formed the core layer.

A lightweight additive such as vermiculite or kenospheres can be advantageous for the core layer. The addition of mica to the core layer and/or the outer layers can significantly improve the fire-protection property of the sheet. Gypsum or plaster of Paris can also be mixed into the outer or inner layer as an additive. Additives in the form of further reinforcing fibers, such as glass shavings, can also be advantageous for the outer layer. Paraffin granules added to the outer layer can also be melted during the drying process, as a result of which a deeply extending water-protection impregnation is achieved.

The sheet illustrated in section in FIG. 3e corresponds in construction to the sheet of FIG. 3c. However, a pigment was added to the quantity of water supplied via the last spray nozzle 43, so that a surface 39 of bound pigment is provided. In order to achieve specific structural shapes and strengths, it can be advantageous to vary the quantity of water supplied to the individual layers for their additional moistening. For example, it can be advantageous to provide a greater quantity of water to the outer surfaces of the molded member than to the inwardly disposed layers, so that a smooth surface can be achieved that does not have to be post-treated. In particular, any additive, for example an accelerator, can be added via the water quantities supplied for the additional moistening. These additives are preferably soluble in water. It can be advantageous to add other additives to the quantity of water supplied to the outer layers than to the water quantities supplied to the inner layers. The additives for the water quantities of the outer layers are preferably in the form of suspensions or dispersions.

Figure 2:
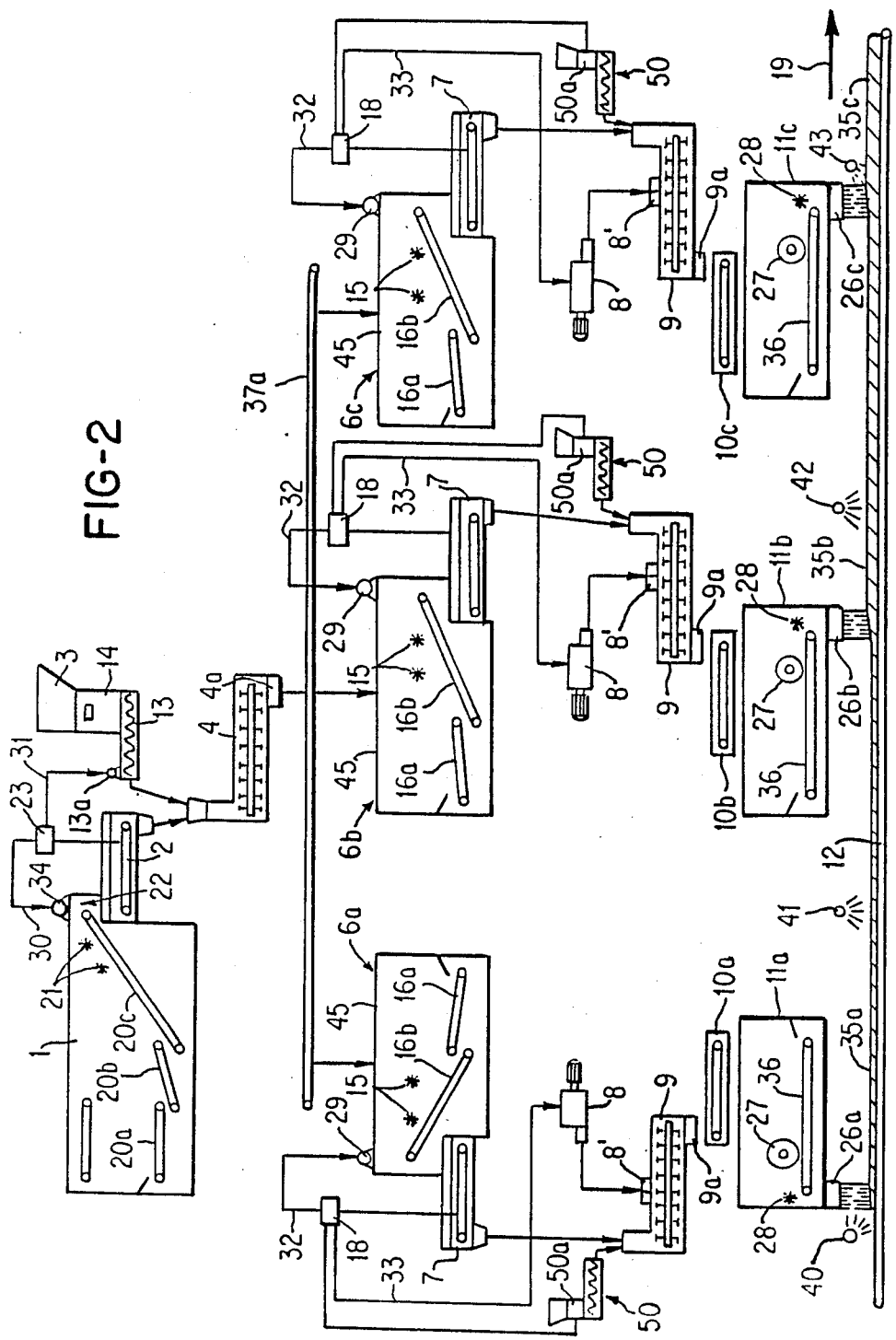
FIG. 2 shows a second inventive embodiment of an apparatus for carrying out the inventive method, with the mass flow being divided subsequent to the dry mixing process.

FIG. 2 illustrates another inventive embodiment of an apparatus for carrying out the inventive method. This apparatus corresponds to a large extent to the basic structure of the apparatus of FIG. 1, with components that are the same in both apparatus being designated by the same reference numerals.

In contrast to the apparatus of FIG. 1, in this embodiment the division of the mass flow into a plurality of partial mass flows is already provided at the outlet of the dry mixer 4. The dry, pre-mixed quantity of gypsum and fiber passes directly via the outlet 4a of the dry mixer into a distribution device 37a which divides the mass flow into individual mass flows having the same or different volumes. This division preferably takes place by cyclical reversal of the main mass flow on conveyer belts of the partial mass flows. These conveyer belts open into the intermediate hoppers 6a to 6c. In the illustrated embodiment, the main mass flow is divided into three partial mass flows. In conformity therewith, three devices 6a to 6c are provided for measuring out gypsum and fibers. These gypsum/fiber metering devices 6a to 6c correspond in construction to the device 6 of FIG. 1 for measuring out gypsum and fibers. The gypsum/fiber metering devices open into a wetting mixer 9 to which water is added in conformity to the quantity of gypsum/fiber mixture that is withdrawn, as controlled by the control device 18. Furthermore, the desired quantity of additive is supplied to each partial mass flow by means of a device 50 for measuring out additive. This quantity is weighed by a metering scale 50a, and is transmitted as a signal to the control device 18. The output 9a of the wetting mixer 9 opens directly onto one of the conveyer belts 10a to 10c, which directly supplies the moistened partial mass flow mixture to an associated dispersal mechanism 11a to 11c. Although the division of the mass flow into partial mass flows already after the dry mixer requires greater expenditure for equipment, the result is that the time it takes the moistened mixture to reach the press is very short, since the moist gypsum/fiber mixture is supplied directly to the dispersal mechanism after leaving the wetting mixer 9, with the dispersal mechanisms spraying or dispersing the partial mass flows onto the forming line 12. The apparatus of FIG. 2 furthermore has the advantage that the additives which are to be mixed into a given partial mass flow can be mixed therein in a dry state.

Figure 6:
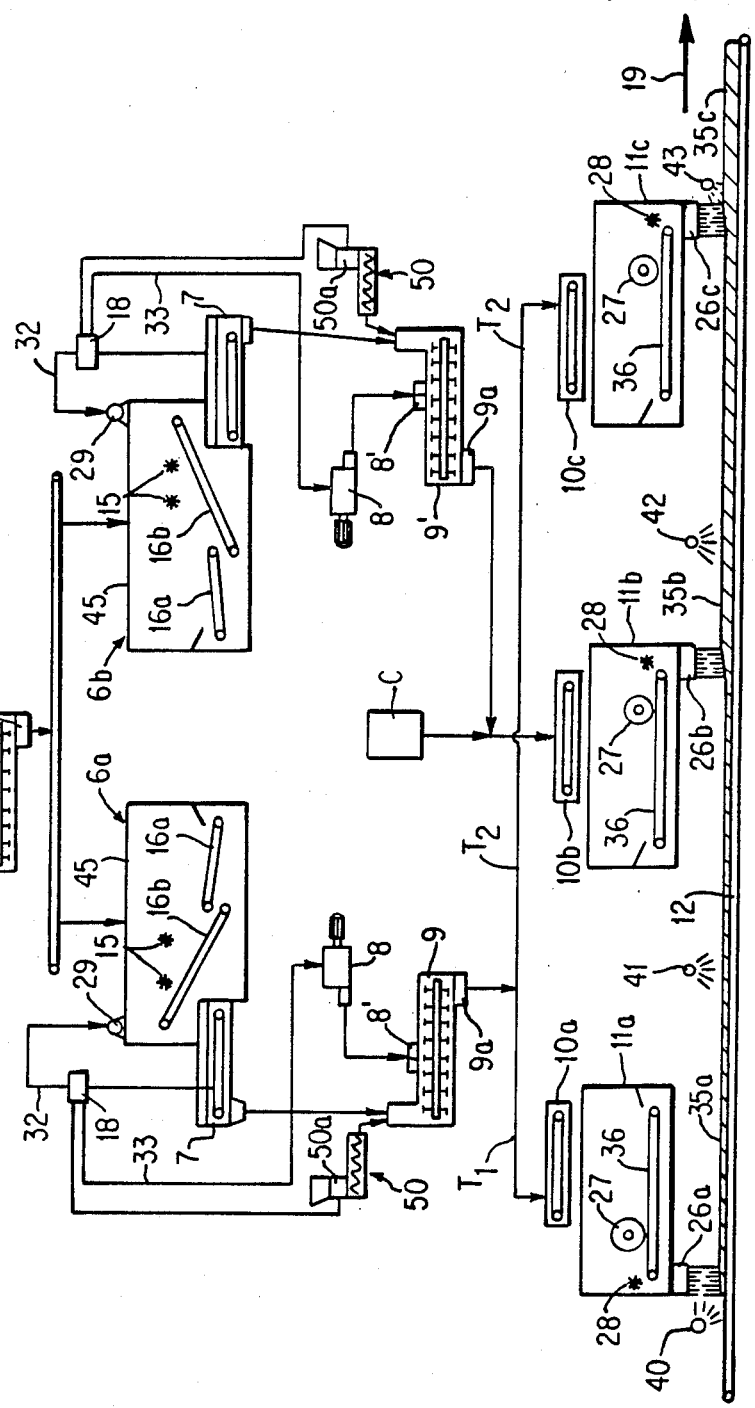
FIG. 6 shows a further inventive embodiment of an apparatus for carrying out the inventive method with which two outer mixers for the cover layers provided with the apparatus of FIG. 2 are combined into a larger mixer.

The preferred embodiment is that according to FIG. 2 with which the dry mass flow is divided before water is added for binding of "calcined" gypsum or plaster. The embodiment according to FIG. 6 shows an apparatus with which the two outer mixers for the cover layers according to FIG. 2 are combined into a larger mixer shown in the illustration of FIG. 6 as the left mixer 9. The moistened plaster or "calcined" gypsum fiber material mixture discharging from this mixer 9 travels via conveyer or transporting means $T_1$, $T_2$ to the dispersal machine 11a strewing or dispersing the lower cover layer at the left respectively via $T_2$ to the right strewing, spraying or dispersal machine 11c dispersing the outer cover layer. The moistened plaster or calcined gypsum fiber material mixture from the right moisture mixer 9' comes or travels via a conveyer or transporting belt $T_3$ as schematically represented to the middle or intermediate dispersal station 11b, which places or disperses the middle or intermediate layer of the triple-layer plaster or calcined gypsum fiber material mat to be located upon the forming line 12.

The advantage of this embodiment of FIG. 6 exists therein that the moistened plaster or calcined gypsum fiber material mass to be strewn or dispersed for the lower and outer cover layer is absolutely homogenous. With that, an optimum symmetrical plate or panel results with corresponding symmetrical physical characteristics (strength).

The dividing-up, distribution or allotting of the mixture material upon the two mixers 9, 9' (FIG. 6) is as follows: 60% of the entire mass goes via the moisture or wetting mixer 9' into the core layer and 40% all told or all together goes into the cover layers of the sheet, plate or panel to be placed or formed.

Furthermore, with the embodiment of FIG. 6, there is noted that via the vessel or container C there is added to the center or middle layer before the strewing, spraying or dispersal so many liters of Perlite as amounts to the weight of the mixture of plaster-fiber in kg (kilogram). For example, 9 liters of Perlite per quadratic meter of the plaster-fiber-material-mass to be dumped or poured is added in the central or middle layer when the weight of the mixture plaster-fiber-material to be poured or dumped per quadratic or squared meter amounts to 9 kg.

An example for carrying out the inventive method according to FIG. 6 can be set forth as follows:

Per $m^2$ finished plaster-fiber plate or panel is employed in the dry mixer 4:

$$\begin{array}{rl} 1.4 \text{ kg} & \text{fiber material} \\ \underline{6.6 \text{ kg}} & \text{calcinated plaster (Gips)} \\ 8.0 \text{ kg} & \text{dry mixture of fibers and calcinated plaster (Gips),} \\ & \text{also called stucco or plaster-of-Paris} \end{array}$$

These 8.0 kg are divided as follows:
4.8 kg for the center or middle layer, accordingly for the mixer 9' referring to FIG. 6

3.2 kg mixture for the mixer 9, accordingly for dividing upon the two cover layers There is noted that 1.4 kg water is supplied in the moist or wetting mixture 9' as to the 4.8 kg fiber-material-plaster-mixture for the center or middle layer. The cover layer mixer 9 receives 0.06 kg water for the 3.2 kg plaster-fiber-material mixture to be mixed.

Furthermore, 8 liters Perlite is supplied to the center or middle layer with the indicated sample embodiment and this equals 0.88 kg Perlite. The cover-layer material contains no Perlite; the cover-layer material after strewing or dispersal upon the forming line 12 is wetted or moistened via the two outer jets or nozzles 40, 43 with respectively 0.08 kg water per $m_2$.

Accordingly with that collectively or all together there is noted that 1.44 kg water for the 1 $m^2$ plaster-fiber-material mixture can be added in the mixer 9' for the center or middle layer and 0.86 kg water is added in the mixer 9 for the two cover layers in addition to 2×0.08 kg water for the two cover layers after the strewing or dispersal of the cover layers. With that accordingly collectively or all together 2.46 kg water were employed for a 1 $m^2$ sheet, plate or panel plaster-fiber-material mixture. The stoichiometric water quantity or volume accordingly that water quantity or volume which is necessary for mere or sole setting of the employed plaster quantity of 6.6 kg, amounts to 1.12 kg. The excess water, accordingly water added supplemental or in addition to the stoichiometric water quantity, a so-called free water, amounts with that accordingly to 1.34 kg per $m^2$, which represents approximately 20% of the plaster-of-Paris employed for a $m^2$ plaster plate or panel. The mixer 9' for the central or middle layer with that accordingly receives approximately 30% water, with respect to the dry mass of the plaster, while the mixer 9 for the two cover layers receives only 27% water. This has the advantage that the cover layers can be strewn or dispersed more uniformly and smoothly because the mass to be strewn or dispersed is somewhat more dry. The central or middle strewn or dispersed layer is with 30% water proportion within the inventive scope or framework, namely above the stoichiometric water quantity of 14% being set or designated and accordingly moistened or wetted with at least 27% water with respect to the dry-plaster mass or quantity. Accordingly with that the inventive over wetting or moistening amounts to 22%. There is conceivable that the spray nozzle or jet 41 provided according to FIGS. 1 and 2 for the wetting or moistening of the central or middle layer can be eliminated with the embodiment according to FIG. 6. In this situation the entire additional water quantity or volume is added in the moistening or wetting mixer 9'.

There is to be taken into consideration that the expression "gypsum" can be set forth more precisely as "calcined gypsum" applicable throughout the entire specification in the present case and furthermore the expression "calcined gypsum" also is designated as "plaster-of-Paris" or "stucco".

According to the ASTM designation: C11-70 incorporated herewith by reference thereto as to standard definitions of terms relating to gypsum, effective Oct. 2, 1970, generally uses the technical terminology "calcined gypsum" which is defined as a dry powder: primarily calcium sulfate hemi-hydrate, resulting from calcination of gypsum; cementitious base for production of most gypsum plaster; also called plaster-of-Paris, sometimes called stucco. Moreover the terminology "gypsum" per se is defined as the mineral consisting primarily of fully hydrated calcium sulfate, —$2H_2O$ or calcium sulfate dihydrate (C22).

The foregoing example provided in conjunction with FIG. 6 of the drawings can be taken as basis for method and apparatus improvements with respect to water addition to the outer layers and the inner layer corresponding to the specific details set forth in the example. The apparatus itself according to FIG. 6 can be characterized thereby that for the central or middle layer there is provided a mixer 9' and for the inner and outer cover layer there is provided a mixer in common with separate conveying means or transporting arrangement $T_1$, $T_2$ for the strewing, spraying or dispersal machines and that a spray nozzle or jet 40 for the water spraying upon the forming line 12 is mounted or arranged prior to the spraying or strewing machine or dispersal mechanism 11a for the dispersal of the lower cover layer.

A spraying device or nozzle 43 is mounted or journalled subsequent to the dispersal mechanism 11c for the dispersal of the upper cover layer. The spray nozzle or jet previously provided for the central or middle dispersal mechanism 11b can be eliminated with the embodiment of FIG. 6. Also there can be noted that the features in accordance with FIG. 6 have a container or supplemental-addition device or apparatus C for the addition of Perlite arranged subsequently as to the wetting or moisture mixer 9'; via this container or supplemental-addition device C there is noted that the Perlite is added to the wetted or moistened mixed material and is conveyed therewith to the central or middle dispersal mechanism 11b which in effect is a central strewing or spraying station.

According to Webster's "Third New International Dictionary", there is noted that the term "gypsum" is a raw material for "making plaster-of-Paris". An average man skilled in the art having generally basic knowledge can take from this term that a method for continuous production of shaped or formed bodies, especially sheets, plates or panels, is described as made of a mixture of fiber material and gypsum (Gips) or plaster-of-Paris taking the term "gypsum" as a raw material for this method specifically designated as "dry gypsum/fibrous material". The reference has been made previously to such dry, premixed gypsum/fiber mass and the entire disclosure is to be taken to describe and set forth nothing other than "calcined gypsum" also called "stucco" or "plaster-of-Paris". "Dry gypsum", accordingly "calcined gypsum", particularly as a rule is considered a starting product for production of "gypsum-based building products".

The stoichiometric water quantity or volume with the inventive calcined gypsum or plaster-of-Paris plates or panels as a rule amounts to approximately 17% of the dry plaster-of-Paris mass. This is the water quantity necessary for setting of the plaster-of-Paris, which the dry plaster mass requires but is necessary for setting or binding thereof. Accordingly 17 parts of water are found in 100 parts of dry plaster-of-Paris.

According to the present invention in addition to the 17% water quantity necessary for setting or binding (and these 17% are stoichiometric water quantity), there is to be noted that once again still further up to 25% water quantity or volume relative to the dry gypsum or plaster-of-Paris mass is to be added. In other words, according to the present invention, 17% water quantity is added to the dry mass, accordingly the stoichiometric water quantity per se, which is necessary for setting or binding of the gypsum or plaster-of-Paris and additionally still further as an additive there is added an excess water quantity of up to 25% related to or with respect to the dry plaster-of-Paris mass.

This can be stated differently by setting forth additionally moistening each of the layers with water prior to dispersing a subsequent layer thereon, with the total quantity of water supplied for a given molded member equalling up to 25% based on the weight of calcined gypsum more than the stoichiometric quantity of water required for setting, binding or curing or expressed differently again that the molded member exceeds the stoichiometric amount by up to 25% water based on the weight of the calcined gypsum.

Further for clarification purposes there can be noted that sometimes as a starting material there is designated "fibrous alpha-calcium-sulfate hemi-hydrate as a raw material" and this can be designated in a shortened form as "alpha-hemi-hydrate-gypsum or plaster". This gypsum or plaster arises in the aqueous solution under hydrothermal conditions via re-crystallization. However there must be noted that a basic difference exists between such "alpha-hemi-hydrate-plaster" when compared with "calcined gypsum", accordingly plaster-of-Paris because the latter results via vaporization of water (dry de-watering). Both types of plaster are completely different and have entirely different characteristics, which naturally is well known to the average man skilled in the art so that for the expert the distinctions between the "alpha-hemi-hydrate-plaster" and "calcined gypsum" should be readily apparent. Thus the present disclosure is to be so understood that only "calcined gypsum" is to be understood and this is a dry powder such that the mixture can be referred to as "dry gypsum/fibrous material" or plaster-of-Paris and not mineral gypsum occurring per se in nature.

The calcined gypsum exclusively involved in the present disclosure is a "dry powder" employed in a first mixing step or procedure respectively dosed quantity having the calcined gypsum and fiber material intimately or fervently mixed with each other and furthermore that the mass of the dry calcined gypsum/fiber material mixture is measured according to which the dry calcined gypsum-fiber material mixture is moistened or wetted in a second mixing step or procedure subject to dosed addition of water corresponding to the measured mass mixture.

On the basis of the foregoing there should be understood the distinction between the exact chemical designations "alpha-calcium sulfate-hemi-hydrate" and "powdered beta-calcium-sulfate-hemi-hydrate" as a raw material. Two methods exist for production of plaster forms or molds including particularly the following:

(a) firing fibrous alpha calcium sulfate hemi-hydrate as a raw material, molding the resulting fibrous calcium sulfate anhydride, curing and drying the resulting molding; and (b) mixing powdered beta-calcium sulfate hemi-hydrate as a raw material with a suitable amount of water, papering and dehydrating the resulting paste.

The prior art discloses fibrous alpha-calcium sulfate hemi-hydrate as a raw material which is usually obtained as a suspension by any well known methods, for example, heat-treating of calcium sulfate dihydrate in water or the mixture between water and water-soluble organic solvents, such as alcohols, ketones and the like; and heat-treating of calcium sulfate in acidic solvent.

Alpha-hemi-hydrate is crystalline while "calcined gypsum" also designated as "plaster-of-Paris" has a porous granular structure. Both types of plaster for this reason have completely different physical characteristics and require entirely different production processes. Alpha-hemi-hydrate plaster occurs in an aqueous solution under normal hydrothermal conditions via recrystallization, fractual crystallization or crystalline transformation or modification or granulation. Plaster-of-Paris, accordingly beta-hemi-hydrate results via heating of "calcined gypsum", in other words via vaporization or evaporation of water so that hollow spaces or chambers result. An average man skilled in the art also knows that alpha-plaster, because of the hard and dense characteristic thereof, is employed as hard mold plaster in medicine and for cast molds. As a construction element however alpha-hemi-hydrate would be employed only in exceptional situations.

The object of the present invention is fulfilled and met via the characterizing features of the present disclosure. With the present inventive method it is possible to produce very good strength values with small or nominal spraying, strewing or dispersal in a continuous production method or procedure. Additionally, the sheets, plates or panels produced according to the teaching of the present invention have surfaces of high quality which are free of pocks or blemishes and for this reason not requiring any grinding or polishing.

The inventive method also makes possible the addition of water to the dosed plaster-fiber mixture so controlled or regulated and so measured that the moistened or wetted plaster-fiber mass does not granulate or become lumpy or exist in clumps. Hereby the boundary value is dependent upon the preselected mixing ratio or relationship and the type of raw materials. The dividing of the plaster-fiber material mass into separated or separate partial flows additionally has the advantage that the added water is uniformly and finely distributed in the entire mass.

Consequently with the present inventive method there can be produced plates, sheets or panels with good uniformly remaining transverse sress and strength as well as flexure, transverse strength or bending strength produced on a mass production basis and having a qualitatively high value surface condition which is free of even very small pocks or depressions. Via the exact or accurate dosing of the component parts of the gypsum-fiber plate or sheet including the accurate or exact dosable water or moisture addition as small or nominal as possible there is furthermore attained and achieved that the time for the drying of the finished pressed plaster or sheets can be kept optimally short, whereby likewise the necessary energy cost and requirement can be reduced.

In practice there has been shown that an exact stoichiometric water addition is comparatively difficult, since always smaller variations or fluctuations in the mixing ratio and in the quality of the raw materials arise and are encountered. Consequently it can occur that with excessive water addition, a subsequent drying of the plates or sheets becomes necessary or that with a water addition that is too small or nominal, insufficient water is available or at hand for the setting, curing or binding reaction of the gypsum, which can lead to a weakening of the plates, panels, or sheets.

It can furthermore be disadvantageous that with a stoichiometric water addition there remains a residue moisture in a range between 1% to 3%, which corresponds to a quantity in a range of 5% to 15% of non-set, non-cured or non-bound gypsum, which likewise can lead to a weakening of the plate, sheet or panel structure. In range of 0% to 3% residue moisture, the gypsum-fiber material experiences relatively large volume changes or variations, which can result in up to 0.3% linear length change or variation (3 mm/m). This is noticeable as especially disadvantageous with employment of gypsum-fiber plates, sheets or panels where accurate dimensioning respectively tolerances are important during placement, installation respectively during fitting of such plates, sheets or panels. When particularly grooveless or gapless placed plates, sheets or panels are installed with a residue moisture of up to 3% and then dry out up to 0% residue moisture, these joints, seams, spaces or gaps can tear open during subsequent equalization to the environmental temperature.

Finally there was found that the curing or setting procedure proceeds disadvantageously with stoichiometric water addition. The gypsum particularly crystallizes respectively on the spot, because water for transporting of calcium-sulfate-ions is not available. Consequently the danger exists that the plate, sheet or panel becomes a baked aggregation of granules or kernels, which keep the original configuration of the gypsum kernels or granules.

If the surfaces of the form or mold body subsequently are sprayed with water, accordingly the surface receives a rigid, uniform structure. There has been shown however that this advantageous hardening, solidification, stabilization and consolidation or strengthening of the surface does not yet assure a good plate, panel or sheet quality. It can occur that during nailing or screwing of the plate or panel, larger pieces break out from the solidified surface.

Collectively via the present invention accordingly a method is produced with which form or mold bodies, especially plates, sheets or panels are obtained from a mixture of gypsum and fibrous material with optimum nominal setting, curing and drying time on the basis of a continuous high strength based on small or nominal spraying, strewing or dispersal.

In order to add the water quantity or volume necessary for curing or setting, the mass flow is divided into several partial mass flows separate from each other, whereby each partial mass flow is strewn, sprayed or dispersed as a layer of the form or mold body upon the under layer, respectively the previous layer. Each layer is subsequently moistened or wetted with a prescribed water quantity or volume independently of the previous layers. With that the supply or addition of the entire water (including the water quantity for moistening or wetting of the dry gypsum-fiber-material mixture) is so controlled and regulated that a water quantity or volume is added to the form or mold body, which is up to 25% greater than the stoichiometric water quantity or volume which mathematically is necessary for curing or setting of the gypsum-fiber-material mixture.

Preferably the over stoichiometric water addition exists in a magnitude in a range between 15% to 20% of the gypsum mass (compare FIG. 4). Since the additional water quantity or volume is supplied or added distributed upon the layers, a post-mixing is eliminated and the disadvantageous clumping respectively granulation of the gypsum connected therewith also is eliminated.

Via the over stoichiometric water addition there is assured that sufficient or adequate water is available or at hand with a setting or curing procedure in order to assure a transporting of the calcium sulfate ions in all directions. This assures and guarantees that the form or mold body is completed or crystallized-out in well embodied, idiomorphous, needle-shaped crystals, which are strongly grown together with each other and thoroughly matted together with each other. High mechanical strengths of the plate, panel or sheet are attained hereby.

Beyond that, the over stoichiometric water addition effects a rising or increasing plasticity or formation of the gypsum during pressing or extruding thereof. This means that the gypsum material can be pressed or extruded in all hollow spaces or chambers which again on the other hand effects a better fiber binding or setting. The plasticity additionally permits the employment of a somewhat coarser ground gypsum, whereby economic advantages arise and occur. Via the adhesive force of the wet gypsum, additionally resetting or restoring forces of the cellulose fibers deformed during the pressing are compensated.

Consequently, the power press can be opened immediately after brief pressing without there being necessary to match or adapt the pressing time to the curing or setting procedure. Via the higher plasticity there is noted that the surface of the form or mold body matches or adapts itself exactly to the press base or foundation, whereby a smooth press foundation reproduces or forms a smooth surface.

In contrast, pitted or pocky surfaces of the plate, panel or sheet can be caused to occur with exactly stoichiometric water addition to dusty or powdery surfaces or with only small or nominal over stoichiometric water addition. With a wet method having a great water excess in contrast there must be worked or operated with structured rollers or sieves (screens), which makes possible a postgrinding or subsequent machining. With that there must be figured with grinding losses of the plate in a magnitude of at least 3%, mostly however 10%.

A curing or setting procedure of the gypsum is considerably expedited or accelerated with an over stoichiometric water addition in a magnitude up to 25%, preferably in a range of approximately 15% to 20%, whereby the cost for the setting or curing distance or path with a continuously operating system or installation is considerably smaller than with comparable systems or installations.

When according to a further feature of the present invention the partial mass flow has different mass volume, the layers can be constructed or embodied having a different thickness. In order to attain a central or intermediate core layer and a multiplicity of strewn, sprayed-on or dispersed layers therewith, the number of partial mass flows is uneven. Hereby, every partial mass flow can have additive materials admixed thereto; additive or extra materials are added preferably especially in volumes of greater partial mass flow of the core layer.

Similarly the supply of the individual water quantities or volumes is controlled or regulated, which amount in the collective quantity preferably in a range of 15% to 20% above the stoichiometric water quantity or volume. The water volume or quantity added to the individual layers after the dispersal, strewing or spraying can be different; especially a greater quantity of water is added to the outer layers of the form or mold body than relative to the inwardly located layers.

The water quantities or volume sprayed upon the individual layers also can contain additive; accordingly it is expedient and purposeful to add suspensions or emulsions of pigments and/or synthetic resins relative to the outer layer of the form or mold body. Consequently for example there can be employed a surface decoration, a water-repellant impregnation or a fire protective means directly during production thereof without a second method or procedural step being necessary. Hereby the present inventive method has an advantageous effect since plates, sheets or panels can be produced with finished surfaces which need not be post-ground or subsequently machined. Also an originally unaccelerated or slightly delayed basic mixture can be expedited or accelerated shortly before the press by addition of accelerating solution (for example kalium sulfate).

The apparatus disclosed for carrying out the method in accordance with the present invention is particularly advantageous.

The present invention is, of course, in no way restricted to the specific disclosure of the specification and drawings, but also encompasses any modification within the scope of the appended claims.

What I claim is:

1. A method of continuously producing molded members as plaster-of-Paris construction plates or panels from a mixture of calcinated gypsum having porous granular structure and dry fibrous material purposely added thereto; measuring respective measured-out quantities of said calcinated gypsum and said dry fibrous material which in a first mixing stage are then subjected to scattering as strewn out for being fervently and thoroughly mixed together, weighing the still dry calcinated gypsum/dry fibrous material mixture and subsequently then moistening the mixture by stepwise adding of water beginning in a second mixing stage by supplying water added as dosaged thereto in conformity with the measured weight of said dry mixture with only so much water being added at least as far as to a stoichiometric water quantity as necessary for absorption by the calcinated gypsum/dry fibrous material mixture for setting and curing thereof while continuously mixing the gypsum/fibrous material to assure said second mixing stage proceeding without any clumping or granulation of the gypsum-fibrous mixture arising therewith; dispersing the moistened mixture subsequently onto a support means including a forming line to progressively form multi-layer molded members, with the surface of each molded member being subjected to additional moistening with an over-stoichiometric quantity of water so that curing is assured with transport of calcium-sulfate ions in all directions so that said molded members as plaster-of-Paris construction plates or panels have only a small or nominal bonding or binding-off and drying time, and the latter then being compacted; said method further includes the improvement in combination therewith comprising the steps of:

dividing a mass flow of said calcinated gypsum/dry fibrous material mixture into several independent partial mass flows separate from each other such that via said dividing into partial mass flows there is attained a result whereby solely further post-wetting or subsequently moistening is made possible respectively in an adequate uniform manner;

dispersing a first one of said partial mass flows onto said forming line of said support means as a first layer of a given one of said molded members;

respectively dispersing a second and subsequent ones of said partial mass flows progressively onto said first and subsequent layers of said given molded member as a second and subsequent layers thereof;

additionally and subsequently moistening each of said layers respectively each with water individually prior to dispersing a subsequent layer thereon, with the total quantity of water supplied for a given molded member including intentionally aimed setting and adjustment of an over-stoichiometric water content equalling only up to a maximum of 25% based on mass of said dry calcinated gypsum above the stoichiometric quantity of water mathematically and analytically necessary for bonding or binding of the calcinated gypsum-dry fibrous material as required for curing of the calcinated gypsum/dry fibrous material mixture dispersed to form said given molded member;

providing high strength in the molded member even with brief curing-drying time and only nominal deviation;

assuring that surface uniformity exists in the entire molded member when finished free of any pocks and pitting;

growing crystals together in situ for assuring uniformity and smoothness of the surface of the molded members; and simultaneously matting the layers together and interlocking the crystals to result in a continuous high mechanical strength over entire surfaces and cross section of the produced molded member finished as the plaster-of-Paris construction plate or panel with this high mechanical strength thereof simultaneously also having only a small or nominal deviation or divergence accordingly to be uniform over and throughout the entire plaster-of-Paris construction plate or panel with very smooth surfaces being obtained.

2. A method according to claim 1, in which the total quantity of water supplied for a given molded member equals approximately 15 to 20% more than the stoichiometric quantity.

3. A method according to claim 1, in which said step of dividing a mass flow of said gypsum/fibrous material mixture into partial mass flows is undertaken after said second mixing stage in which said mixture is moistened.

4. A method according to claim 1, in which said step of dividing a mass flow of said gypsum/fibrous material mixture into partial mass flows is undertaken after said first, dry mixing stage and prior to said second mixing stage.

5. A method according to claim 1, in which said dividing step includes dividing a mass flow of said gypsum/fibrous material mixture in partial mass flows of varying volumes.

6. A method according to claim 1, in which said dividing step includes dividing a mass flow of said gypsum/fibrous material mixture into an odd number of partial mass flows.

7. A method according to claim 1, which includes the step of adding additives to given ones of said partial mass flows.

8. A method according to claim 1, in which one of said partial mass flows forms a core layer, with the volume of this last-mentioned partial mass flow being greater than the volume of any of the other partial mass flows.

9. A method according to claim 1, which includes the step of intermediately storing each of said partial mass flows prior to introducing them into dispersal means for effecting said dispersing step.

10. A method according to claim 1, which includes the step of selecting the volumes of said partial mass flows in such a way that the thickness of a given one of said layers, after said compaction of said molded member, is from 1 to 7 mm.

11. A method according to claim 1, in which said dividing step includes dividing a mass flow of said gypsum/fibrous material mixture into three partial mass flows for producing a molded member of approximately 10 mm thickness.

12. A method according to claim 1, in which said additionally moistening step includes spraying each of said layers with the same quantity of water.

13. A method according to claim 1, in which said additionally moistening step includes spraying each of said layers with varying quantities of water.

14. A method according to claim 13, in which a greater quantity of water is sprayed onto outer layers of a given molded member than onto inner layers thereof.

15. A method according to claim 1, which includes the step of adding additives to said water used for said step of additionally moistening said layers.

16. A method according to claim 15, in which said additives are water-soluble.

17. A method according to claim 15, which includes adding different additives to the water sprayed onto outer layers of a given molded member than to the water sprayed onto inner layers thereof.

18. A method according to claim 17, in which said additives for the water sprayed onto said outer layers are selected from the group consisting of suspensions and dispersions.

19. A method according to claim 1, which includes the steps of monitoring the total quantity of water adding during said second mixing stage and said additional moistening step, and controlling this quantity via predeterminable values in a range of from 15 to 20% more than the stoichiometric quantity.

20. A method for continuous production of molded members as plaster-of-Paris construction plates, sheets or panels from a mixture of calcinated gypsum and dry fibrous material, comprising in a first mixing procedure stage thoroughly mixing with each other respectively dosed quantites of calcinated gypsum and dry fibrous material with each other;
measuring the mass of dry calcinated gypsum/fibrous material mixture;
supplying to the dry mixture of calcinated gypsum and fibrous material water at least up to that quantity which is necessary for binding and curing of the gypsum, such water being designated as a stoichiometric water quantity, and simultaneously continuously mixing the calcinated gypsum and fibrous material;
dividing the calcinated gypsum fibrous material mixture into separate partial flows, dispersing each divided partial mass flow into a layer of a multilayer plate, sheet or panel to be formed upon a forming line respectively; and
adding a further water quantity to each individual layer after dispersing thereof upon the forming line so that the first added water quantity and the second added water quantity, accordingly the collective added entire water quantity, is composed of water quantity required for binding and curing of the calcinated gypsum, such water quantity being referred to as a stoichiometric water quantity, and additionally thereto consisting of an excess water quantity amounting to at most 25% over stoichiometric water quantity based upon the dry gypsum mass.

21. A method according to claim 20, in which said dividing of calcinated gypsum fibrous material mixture occurs after first supplying of water.

22. A method according to claim 20, in which said dividing of calcinated gypsum fibrous material mixture into the individual partial flows occurs prior to supplying of water quantity necessary for binding and curing of the gypsum.

23. A method according to claim 21, wherein adding of a second water quantity occurs during dispersal of calcinated gypsum fibrous material mass already wetted and moistened with the first water quantity.

24. A method according to claim 23, in which said second adding of water occurs directly during dispersing of the lower cover layer by spraying upon the molding line, which adding of water likewise occurs for the central middle layer also during dispersing of the middle layer and such adding of water occurring for the cover layer after dispersal of the cover layer upon the molding line.

25. A method according to claim 20, in which the water quantity in addition to stoichiometric water quantity and referred to as over stoichiometric water quantity amounts to approximately a range between 15% to 20% based upon the dry calcinated gypsum mass.

26. A method according to claim 20, in which the dividing into separate partial flows occurs before moistening and wetting of the mixture.

27. A method according to claim 20, in which the moistening and wetting occurs after the dividing into separate partial flows of mixture.

28. A method for continuous production of molded bodies especially as molded members of plates, sheets or panels from a mixture of calcinated gypsum and fibrous material, comprising the steps of:
thoroughly mixing respectively dosed quantities of calcinated gypsum and fibrous material with each other in a first continuous mixing stage;
moistening and wetting the dry calcinated gypsum fibrous material thereafter in a second continuous mixing procedure subjected to dosed supplying of water after which the moistened and wetted mixture is dispersed upon a foundation including a forming line to support molded bodies and subsequently pressing the same;
continuously measuring the mass of dry calcinated gypsum fibrous material mixture before the second mixing stage and adapting the supplying of water commensurate with the measured mass, whereby the dosing of added water quantity is maintained below a limited boundary value in a second continuous mixing procedure with which the moistened and wetted calcinated gypsum and fibrous material mass would otherwise be inclined to granulation respectively clump formation;

dividing the mass flow of the calcinated gypsum fibrous material mixture into partial mass flows separate from each other;

dispersing at each partial mass flow into a layer of the molding body upon the forming line respectively upon a previous layer already subjected to said dispersing; and subsequently moistening and wetting each dispersed layer with water so that collective water quantity added and supplied to a molded body lie significantly above stoichiometric water quantity necessary for binding and curing above the calcinated gypsum fibrous material mixture dispersed relative to the molded body.

29. A method according to claim 28, wherein the collective water quantity supplied is up to 25% preferably in a range of approximately 15% to 20% greater than the stoichiometric water quantity.

30. A method according to claim 28, in which said dividing of the calcinated gypsum fibrous material mixture with the dosed water adding occurs after a second mixing stage and procedure.

31. A method according to claim 28, in which said dividing of the calcinated gypsum fibrous material mixture occurs after the first stage of mixing procedure and the dosed water adding occurs in the divided partial flows.

32. A method according to claim 28, in which said dividing into partial mass flows occurs having a different volume for each partial mass flow and post mixing additional materials relative to the individual partial mass flows.

33. A method according to claim 28, which includes intermediately storing each partial mass flow before entering thereof into the associated dispersing mechanism.

34. A method according to claim 28, which includes providing volumes of partial flow in such a manner that after mold pressing there results a layer thickness in a range of respectively 1 mm to 7 mm, preferably in a range of 2 mm to 4.5 mm.

35. A method according to clam 28, in which spraying of water quantity differs as applied to the individual layers, preferably such that the water quantity being subjected to spraying upon the outer layers of the molded body is greater than the water quantity being added to the inwardly located layers.

36. A method according to claim 35, in which supplementing of additives such as suspensions, dispersions and the like occur as to the water quantity being supplied to the individual layers, whereby different additives are supplied to the water quantities supplied to the outer layers than as to the water quantities for the inwardly located layers.

* * * * *